(12) United States Patent
White et al.

(10) Patent No.: US 7,401,369 B2
(45) Date of Patent: Jul. 22, 2008

(54) FLUID-FILLED BLADDER FOR FOOTWEAR AND OTHER APPLICATIONS

(75) Inventors: Vincent F. White, Beaverton, OR (US); Jennie R Caudle, Beaverton, OR (US)

(73) Assignee: Nike, Inc., Beaverton, OR (US)

( * ) Notice: Subject to any disclaimer, the term of this patent is extended or adjusted under 35 U.S.C. 154(b) by 229 days.

(21) Appl. No.: 11/107,354

(22) Filed: Apr. 14, 2005

(65) Prior Publication Data

US 2006/0230635 A1 Oct. 19, 2006

(51) Int. Cl.
*A47C 20/02* (2006.01)
*A43B 13/20* (2006.01)

(52) U.S. Cl. .............................. 5/655.3; 36/29; 36/35 B (58) Field of Classification Search ..................... 36/29, 36/35 B; 428/35.7, 73, 78; 5/654, 655.3, 5/655.5, 644, 706
See application file for complete search history.

(56) References Cited

U.S. PATENT DOCUMENTS

| | | | |
|---|---|---|---|
| 1,181,441 A | | 5/1916 | Franklin |
| 3,667,593 A | | 6/1972 | Pendleton |
| 3,922,801 A | * | 12/1975 | Zente ............................. 36/44 |
| 4,017,931 A | * | 4/1977 | Golden ..................... 12/146 B |
| 4,183,156 A | * | 1/1980 | Rudy ............................. 36/44 |
| 4,698,864 A | | 10/1987 | Graebe |
| 5,131,174 A | | 7/1992 | Drew et al. |
| 5,167,999 A | | 12/1992 | Wang et al. |
| 5,201,125 A | * | 4/1993 | Shorten .......................... 36/29 |
| 5,416,988 A | * | 5/1995 | Potter et al. ..................... 36/89 |
| 5,545,463 A | | 8/1996 | Schmidt et al. |
| 5,704,137 A | | 1/1998 | Dean et al. |
| 5,713,141 A | | 2/1998 | Mitchell et al. |
| 6,178,662 B1 | * | 1/2001 | Legatzke ...................... 36/3 R |
| 6,178,663 B1 | * | 1/2001 | Schoesler ....................... 36/43 |
| 6,412,194 B1 | * | 7/2002 | Carlson et al. ................. 36/43 |
| 6,457,262 B1 | | 10/2002 | Swigart |
| 6,516,540 B2 | * | 2/2003 | Seydel et al. ................... 36/29 |
| 6,519,797 B1 | * | 2/2003 | Brubaker et al. ............... 5/654 |
| 6,550,085 B2 | | 4/2003 | Roux |
| 6,695,346 B1 | | 2/2004 | Keshavaraj |
| 6,783,155 B2 | | 8/2004 | Keshavaraj |
| 2002/0013967 A1 | | 2/2002 | Roux |

(Continued)

FOREIGN PATENT DOCUMENTS

GB 1057874 2/1967

OTHER PUBLICATIONS

International Search Report in corresponding PCT Application, International Application No. PCT/US2006/013376, mailed Feb. 6, 2007.

(Continued)

*Primary Examiner*—Ted Kavanaugh
(74) *Attorney, Agent, or Firm*—Banner & Witcoff, Ltd.

(57) ABSTRACT

A fluid-filled structure, such as a bladder, is disclosed. The bladder has a first surface and an opposite second surface that are peripherally joined to define various edges. The bladder encloses a fluid between the first surface and the second surface. A portion of the edges may have a concave configuration, or the edges may have both concave and convex configurations. A shape of the bladder may be a tessellation pattern so that a plurality of the bladder may be efficiently.

24 Claims, 11 Drawing Sheets

U.S. PATENT DOCUMENTS

| | | | |
|---|---|---|---|
| 2002/0121031 A1* | 9/2002 | Smith et al. .................... | 36/29 |
| 2003/0150132 A1 | 8/2003 | Lin | |
| 2003/0200678 A1 | 10/2003 | Nishiwaki et al. | |
| 2005/0011607 A1 | 1/2005 | Hensley et al. | |
| 2005/0028403 A1 | 2/2005 | Swigart et al. | |
| 2006/0156579 A1* | 7/2006 | Hoffer et al. .................... | 36/28 |

OTHER PUBLICATIONS

Three photographs of fluid-filled bladders (model No. K3540-20) manufactured by NIKE, Inc. in 2001.

* cited by examiner

FLUID-FILLED BLADDER FOR FOOTWEAR AND OTHER APPLICATIONS

BACKGROUND OF THE INVENTION

1. Field of the Invention

The present invention relates to fluid-filled structures. The invention concerns, more particularly, a bladder that encloses a pressurized fluid and is suitable for various commodities, including articles of footwear.

2. Description of Background Art

Fluid-filled structures, such as bladders, are utilized in a variety of commodities. For example, fluid-filled structures may be utilized as packing materials, to impart comfort to a backpack or golfbag strap, or to enhance the comfort of seat cushions. One application where fluid-filled structures have gained particular acceptance is footwear.

A conventional article of athletic footwear includes two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower surface of the upper and is generally positioned between the foot and the ground. In addition to attenuating ground reaction forces, the sole structure may provide traction and control foot motions, such as over pronation. Accordingly, the upper and the sole structure operate cooperatively to provide a comfortable structure that is suited for a wide variety of ambulatory activities, such as walking and running.

The sole structure of athletic footwear generally exhibits a layered configuration that includes a comfort-enhancing insole, a resilient midsole formed from a polymer foam, and a ground-contacting outsole that provides both abrasion-resistance and traction. Suitable polymer foam materials for the midsole include ethylvinylacetate or polyurethane that compress resiliently under an applied load to attenuate ground reaction forces. Conventional polymer foam materials are resiliently compressible, in part, due to the inclusion of a plurality of open or closed cells that define an inner volume substantially displaced by gas. That is, the polymer foam includes a plurality of bubbles that enclose the gas. Following repeated compressions, the cell structure may deteriorate, thereby resulting in decreased compressibility of the foam. Accordingly, the force attenuation characteristics of the polymer foam midsole may decrease over the lifespan of the footwear.

One manner of reducing the weight of a polymer foam midsole and decreasing the effects of deterioration following repeated compressions is disclosed in U.S. Pat. No. 4,183,156 to Rudy, hereby incorporated by reference, in which force attenuation is provided by a fluid-filled bladder formed of an elastomeric materials. The bladder includes a plurality of tubular chambers that extend longitudinally along a length of the sole structure. The chambers are in fluid communication with each other and jointly extend across the width of the footwear. The bladder may be encapsulated in a polymer foam material, as disclosed in U.S. Pat. No. 4,219,945 to Rudy, hereby incorporated by reference. The combination of the bladder and the encapsulating polymer foam material functions as a midsole. Accordingly, the upper is attached to the upper surface of the polymer foam material and an outsole or tread member is affixed to the lower surface.

Bladders of the type discussed above are generally formed of an elastomeric material and are structured to have an upper and lower portions that enclose one or more chambers therebetween. The chambers are pressurized above ambient pressure by inserting a nozzle or needle connected to a fluid pressure source into a fill inlet formed in the bladder. Following pressurization of the chambers, the fill inlet is sealed and the nozzle is removed.

Fluid-filled bladders suitable for footwear applications may be manufactured by a two-film technique, in which two separate sheets of elastomeric film are formed to exhibit the overall peripheral shape of the bladder. The sheets are then bonded together along their respective peripheries to form a sealed structure, and the sheets are also bonded together at predetermined interior areas to give the bladder a desired configuration. That is, the interior bonds provide the bladder with chambers having a predetermined shape and size. In a similar thermoforming technique, the two separate sheets of elastomeric film are shaped with a mold to exhibit a desired configuration. Fluid-filled bladders suitable for footwear applications may also be manufactured by a blow-molding technique, wherein a molten or otherwise softened elastomeric material in the shape of a tube is placed in a mold having the desired overall shape and configuration of the bladder. The mold has an opening at one location through which pressurized air is provided. The pressurized air induces the liquefied elastomeric material to conform to the shape of the inner surfaces of the mold. The elastomeric material then cools, thereby forming a bladder with the desired shape and configuration.

SUMMARY OF THE INVENTION

One aspect of the present invention is a bladder with a first surface and an opposite second surface that are peripherally joined to define various edges. The bladder encloses a pressurized fluid between the first surface and the second surface. In some embodiments, the bladder has a hexagonal configuration and a portion of the edges are concave. In other embodiments, the edges exhibit both concave and convex configurations.

The bladder may be incorporated into an article of footwear having an upper and a sole structure. For example, the bladder may be encapsulated within a polymer foam material of the sole structure, or the bladder may be located within a void that is formed in the polymer foam material. Alternately, the bladder may be located within the upper.

The bladder may include a bond between the first surface and the second surface. The bond may be spaced inward from one of the first edges and the second edges, and the bond may define a channel between the bond and the one of the first edges and the second edges. The bladder may also include an inflation area in fluid communication with the channel.

Another aspect of the invention involves a method of manufacturing a plurality of bladders. The method includes a step of providing a first sheet and a second sheet of a thermoplastic polymer material. Bonds may be formed between the first sheet and the second sheet in a tessellation pattern to define the bladders. In addition a portion of the bonds may be bisected and a pressurized fluid may be placed within the bladders.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following discussion and accompanying figures disclose an article of athletic footwear incorporating a fluid-filled bladder. The footwear is disclosed as having a configuration that is suitable for running. Aspects of the invention are not solely limited to footwear designed for running, however, and may be applied to a wide range of athletic footwear styles, including basketball shoes, cross-training shoes, walking shoes, tennis shoes, soccer shoes, and hiking boots, for example. In addition, aspects of the invention may be applied to footwear styles that are generally considered to be non-athletic, including dress shoes, loafers, sandals, and work boots. Although the bladder is disclosed in combination with footwear, the bladder may be utilized in a variety of other products, or the bladder may be utilized alone (e.g., as a packing material). Accordingly, one skilled in the relevant art will appreciate that the concepts disclosed herein apply to a wide variety of footwear styles and products.

Figure 1:
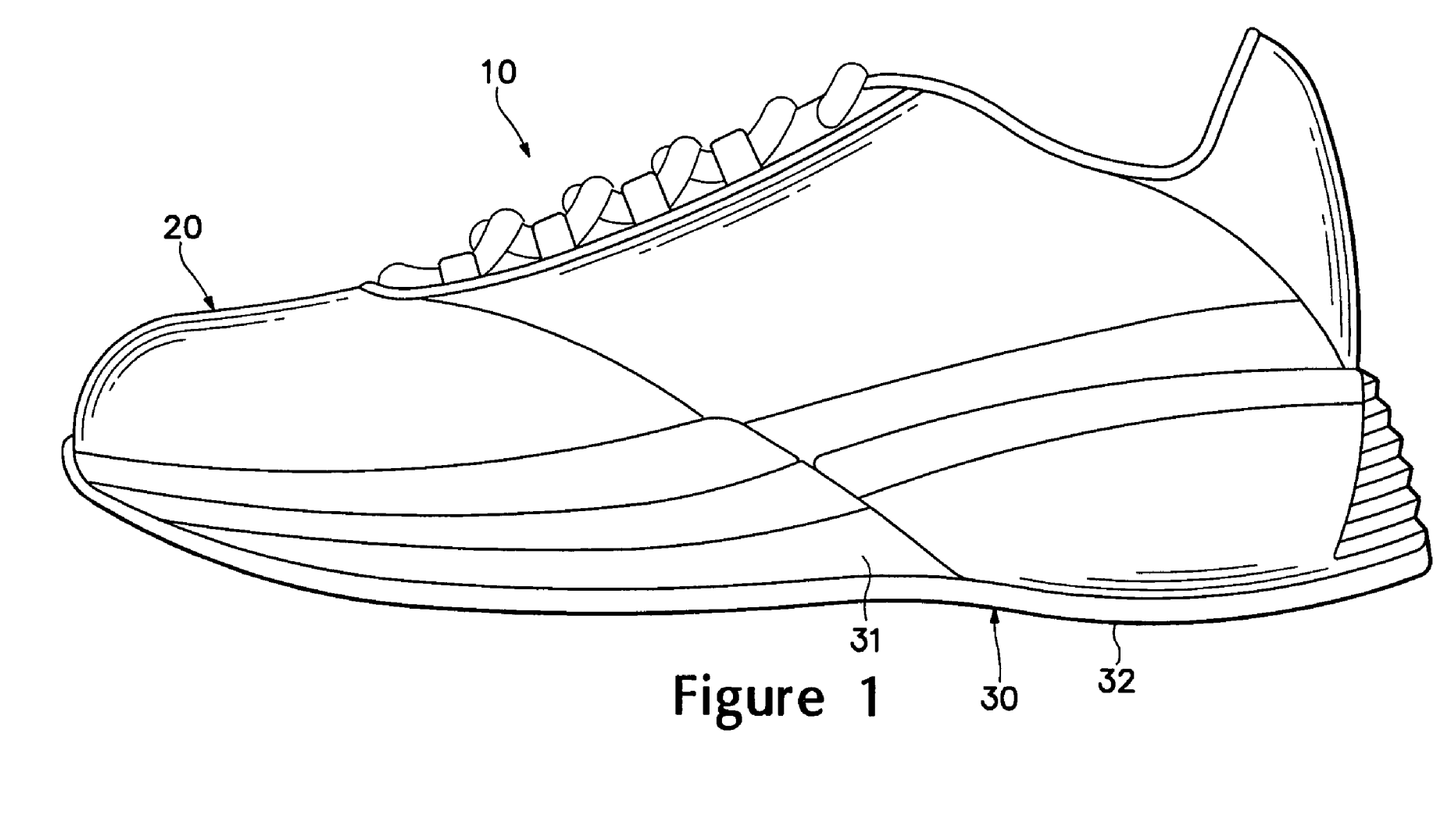
FIG. 1 is a side elevational view of an article of footwear incorporating a bladder.
Figure 2:
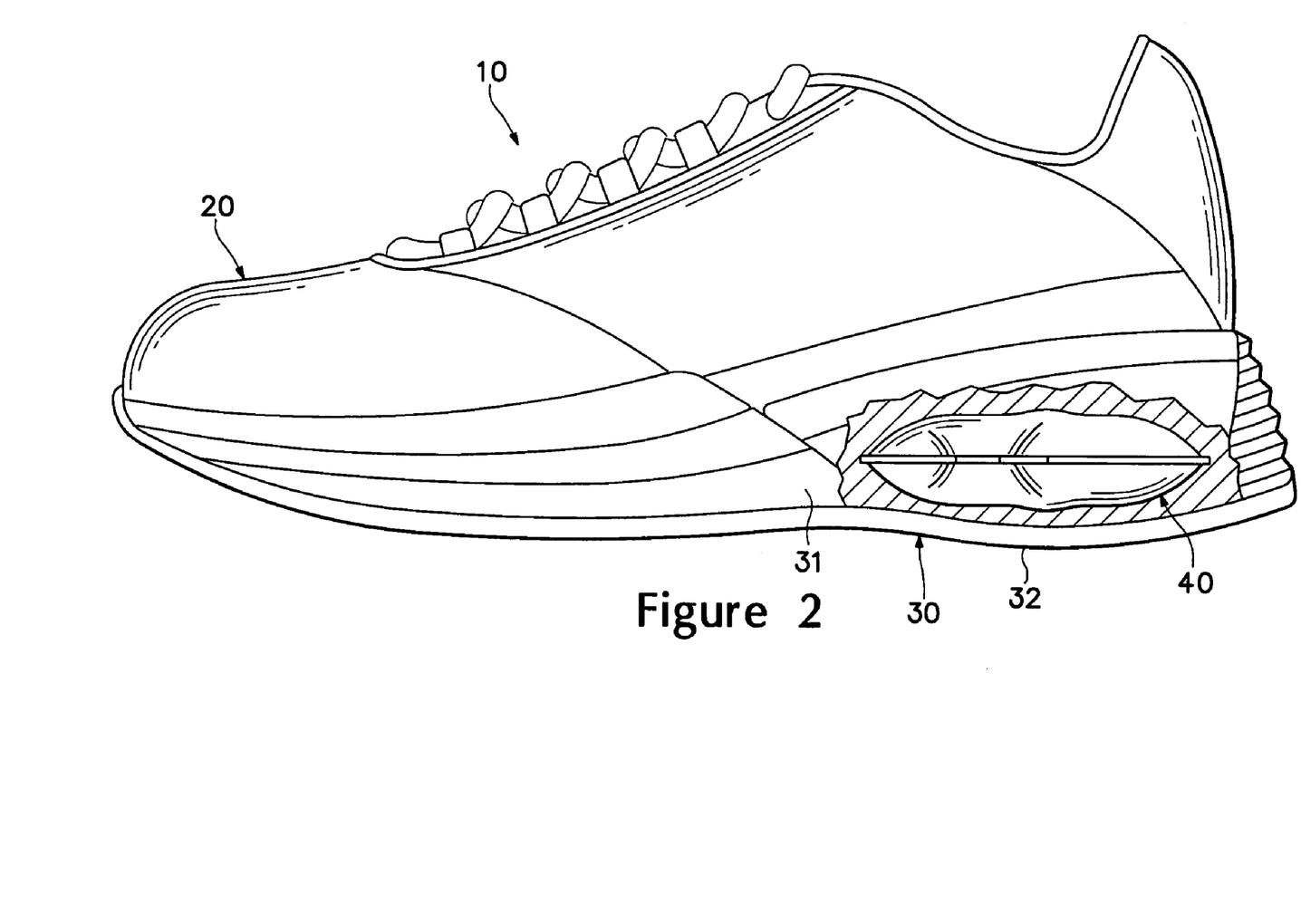
FIG. 2 is a partial cut-away side elevational view of the footwear.
Figure 3:
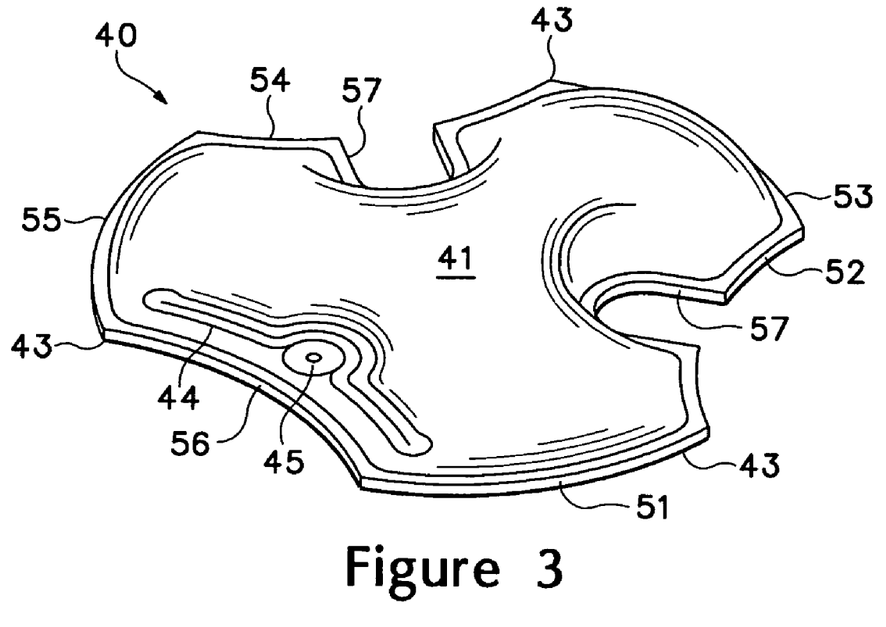
FIG. 3 is a perspective view of the bladder.

An article of footwear 10 is depicted in FIGS. 1 and 2 as including an upper 20 and a sole structure 30. Upper 20 has a substantially conventional configuration and includes a plurality elements, such as textiles, foam, and leather materials, that are stitched or adhesively bonded together to form an interior void for securely and comfortably receiving the foot. Sole structure 30 is positioned below upper 20 and includes two primary elements, a midsole 31 and an outsole 32. Midsole 31 is secured to a lower surface of upper 20 through stitching or adhesive bonding, for example, and operates to attenuate forces as sole structure 30 impacts the ground. Outsole 32 is secured to a lower surface of midsole 31 and is formed of a durable, wear-resistant material that is suitable for engaging the ground. Outsole 32 may be absent in some embodiments of the invention, or outsole 32 may be formed of unitary (i.e., one piece) construction with midsole 31. In addition, sole structure 30 may include an insole (not depicted), which is a thin comfort-enhancing member, located within the void and adjacent to the plantar surface of the foot.

Midsole 31 is primarily formed of a polymer foam material, such as polyurethane or ethylvinylacetate, that encapsulates a fluid-filled bladder 40. As depicted in FIG. 2, bladder 40 is positioned in a heel region of midsole 31, but may be positioned in any region of midsole 31, including a midfoot region or a forefoot region. Furthermore, midsole 31 may encapsulate multiple fluid-filled bladders having the general configuration of bladder 40. For example, one bladder 40 may be located in the heel region and a separate bladder 40 may be located in the forefoot region of footwear 10. Bladder 40 may be only partially encapsulated within midsole 31 or entirely encapsulated within midsole 31. For example, portions of bladder 40 may protrude outward from a side surface of midsole 31, or an upper surface of bladder 40 may coincide with an upper surface of midsole 31. Alternately, midsole 31 may extend over and entirely around bladder 40. In some embodiments, bladder 40 may be adhesively secured to midsole 31, or bladder 40 may be located within a pre-made void in midsole 31, for example. In other embodiments, bladder 40 may be incorporated into upper 20 or the insole. For example, bladder 40 may be located within a heel area of the insole or a forefoot area of the insole. Accordingly, the position of bladder 40 with respect to footwear 10 may vary significantly within the scope of the invention.

Bladder 40 is a sealed member that encloses a pressurized fluid, as depicted in FIGS. 3-6C. The material forming bladder 40, which will be discussed in greater detail below, is substantially impermeable to the fluid and forms a first surface 41 and an opposite second surface 42. First surface 41 and second surface 42 are bonded together around their respective peripheries to form a peripheral bond 43 and cooperatively form a sealed chamber, in which the pressurized fluid is located. As depicted in the figures, peripheral bond 43 is centered between first surface 41 and second surface 42, but may also be in a non-centered location. Accordingly, the specific location of peripheral bond 43 may vary.

Figure 4:
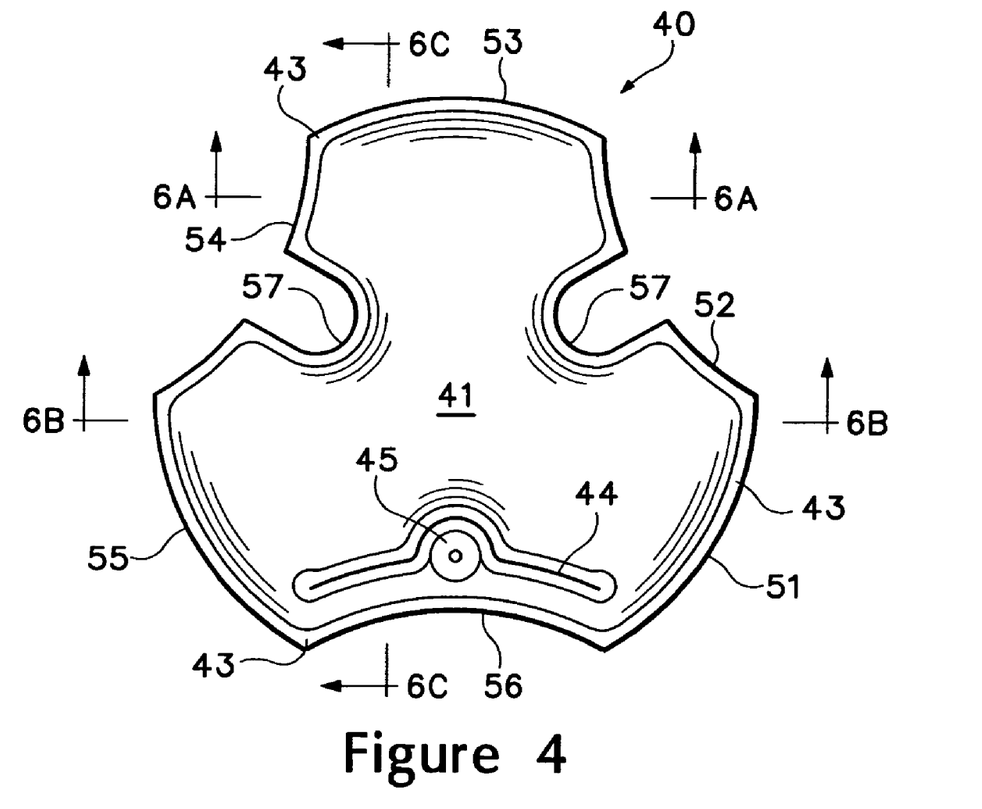
FIG. 4 is a top plan view of the bladder.
Figure 5:
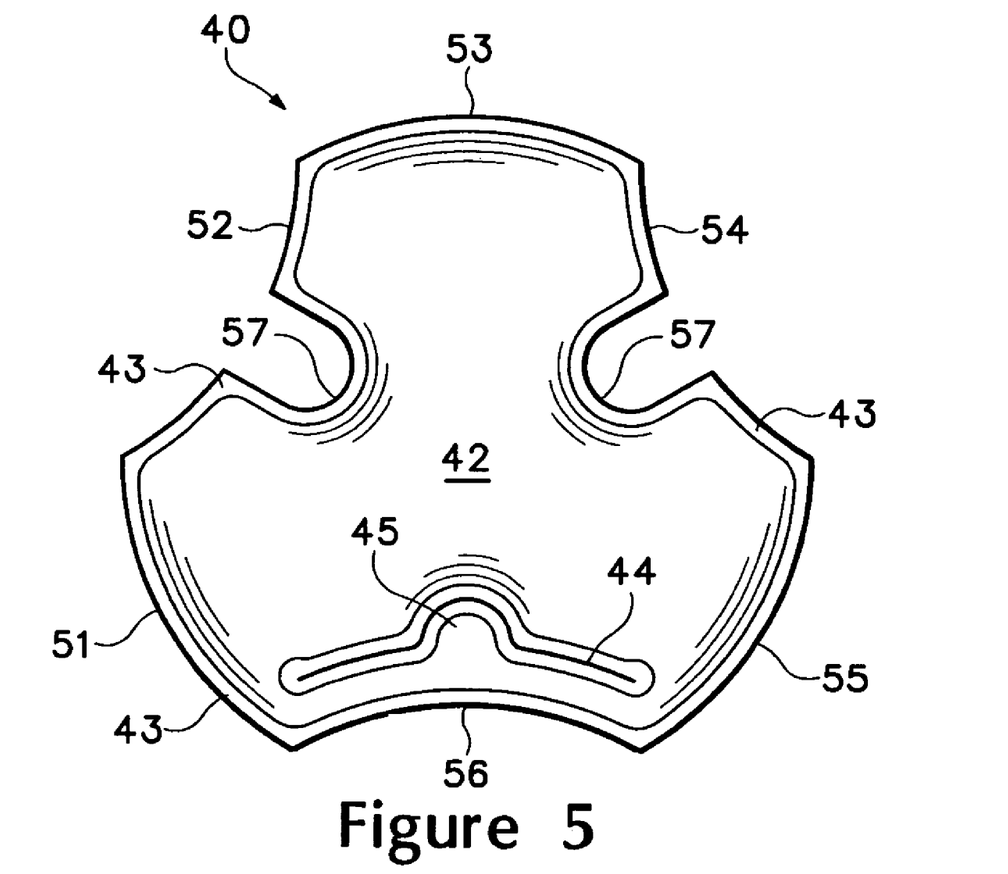
FIG. 5 is a bottom plan view of the bladder.

The general shape of bladder 40, as depicted in FIGS. 4 and 5, is hexagonal. Peripheral bond 43 effectively forms six edges 51-56 that sequentially extend around bladder 40. That is, edge 51 is positioned adjacent to edge 52, edge 52 is positioned adjacent to edge 53, edge 53 is positioned adjacent to edge 54, edge 54 is positioned adjacent to edge 55, edge 55 is positioned adjacent to edge 56, and edge 56 is positioned adjacent to edge 51. Each of edges 51, 53 and 55 extend outward to impart a convex configuration to these portions of peripheral bond 43. In contrast, each of edges 52, 54, and 56 extend inward to impart a concave configuration. Whereas edge 56 has an inwardly-rounded shape, each of edges 52 and 54 also form a further indentation 57 that extends closer to a central portion of bladder 40. That is, indentations 57 of each of edges 52 and 54 protrude closer to the central portion of bladder 40 than edge 56.

As discussed above, each of edges 51, 53 and 55 extend outward to impart a convex configuration to these portions of peripheral bond 43. In addition, each of edges 52, 54, and 56 extend inward to impart a concave configuration. Given this configuration and the locations of each of edges 51-56, the convex portions of peripheral bond 43 alternate with the concave portions of peripheral bond 43. That is, every other edge of bladder 40 is convex, and the other edges are concave. This structure imparts a tri-lobed configuration to bladder 40, wherein each of edges 51, 53, and 55 form ends of the three lobes. Alternately, bladder 40 may be viewed as having a hexagonal configuration that includes three convex edges 51, 53, and 55 alternating with three concave edges 52, 54, and 56.

Bladder 40 has a configuration wherein first surface 41 and second surface 42 are devoid of internal connections in the central portion of bladder 40. That is, peripheral bond 43, which is located at the periphery of bladder 40, forms the primary points where first surface 41 and second surface 42 are bonded or otherwise connected to each other. As depicted in the figures, however, an inflation bond 44 is formed adjacent to the periphery of bladder 40. More particularly, inflation bond 44 is formed adjacent to edge 56, but may be formed adjacent to any of edges 51-56. Inflation bond 44 extends parallel to edge 56, and an inflation area 45 is centrally located with respect to inflation bond 44. As will be described in greater detail in the following material, an inflation needle, inflation nozzle, inflation electrode, or other inflation device may be coupled to inflation area 45 to inject the pressurized fluid. The fluid then passes through a conduit formed between peripheral bond 43 and inflation bond 44. Once bladder 40 is properly inflated with the fluid, inflation area 45 is sealed to seal the fluid within bladder 40. In order to permit the central portion of bladder 40 to expand outward, inflation bond 44 may be cut or otherwise bisected to separate the central portion of bladder 40 from the conduit formed between peripheral bond 43 and inflation bond 44. Accordingly, bladder 40 is effectively devoid of internal connections in the central portion of bladder 40, and inflation bond 44 and inflation area 45 are formed adjacent to the periphery of bladder 40.

Figure 6A:
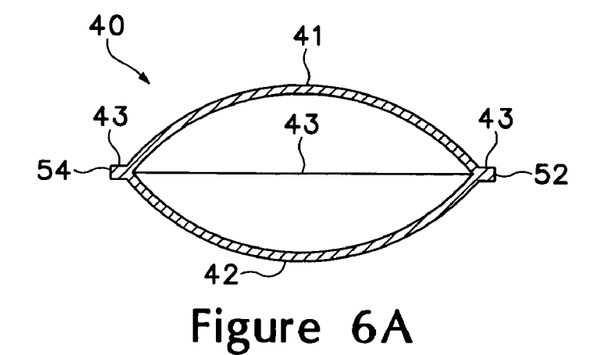
FIG. 6A is a first cross-sectional view of the bladder, as defined by section line 6A-6A in FIG. 4.
Figure 6B:
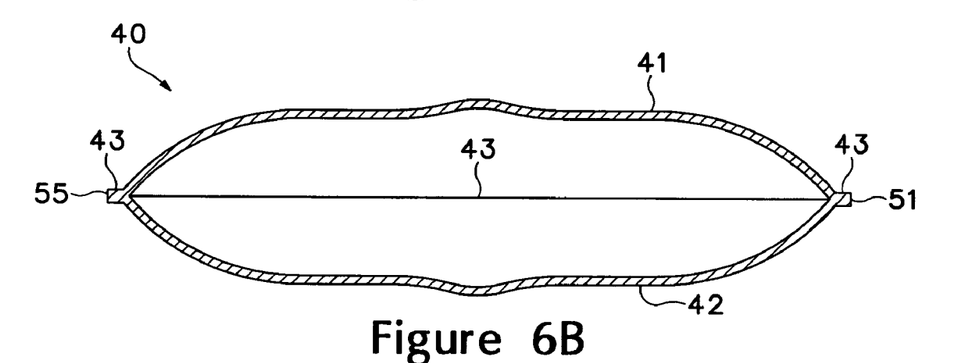
FIG. 6B is a second cross-sectional view of the bladder, as defined by section line 6B-6B in FIG. 4.
Figure 6C:
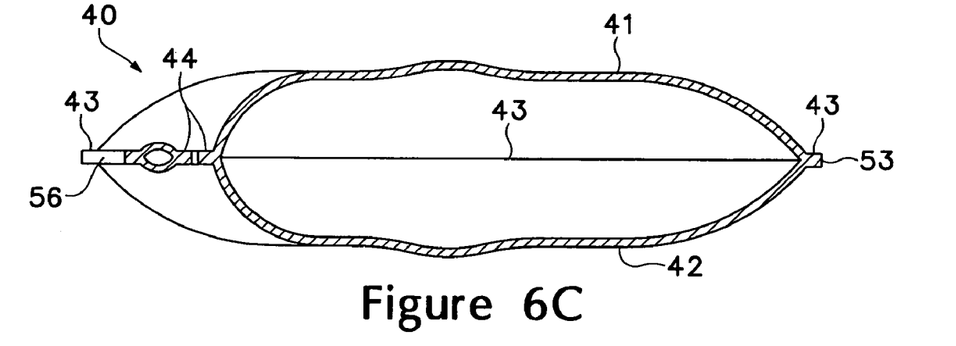
FIG. 6C is a third cross-sectional view of the bladder, as defined by section line 6C-6C in FIG. 4.

As noted above, edge 56 has an inwardly-rounded shape, whereas each of edges 52 and 54 also form indentations 57. Inflation area 45 is effectively formed in a location that corresponds with the location of indentations 57. Accordingly, the portions of bladder 40 adjacent to each of edges 52, 54, and 55 are bonded in similar locations. The lack of internal connections in the central portion of bladder 40 imparts a structure wherein the central portion of bladder 40 exhibits a greater thickness than areas adjacent peripheral bond 43, as depicted in FIGS. 6A-6C. Accordingly, bladder 40 tapers toward peripheral bond 43. Indentations 57 and inflation area 45 are formed in order to limit the degree to which the central portion of bladder 40 expands outward. That is, indentations 57 and inflation area 45 are formed to limit the overall thickness of the central portion of bladder 40.

A variety of thermoplastic polymer materials may be utilized for bladder 40, including polyurethane, polyester, polyester polyurethane, and polyether polyurethane. Another suitable material for bladder 40 is a film formed from alternating layers of thermoplastic polyurethane and ethylene-vinyl alcohol copolymer, as disclosed in U.S. Pat. Nos. 5,713,141 and 5,952,065 to Mitchell et al, hereby incorporated by reference. A variation upon this material wherein the center layer is formed of ethylene-vinyl alcohol copolymer; the two layers adjacent to the center layer are formed of thermoplastic polyurethane; and the outer layers are formed of a regrind material of thermoplastic polyurethane and ethylene-vinyl alcohol copolymer may also be utilized. Bladder 40 may also be formed from a flexible microlayer membrane that includes alternating layers of a gas barrier material and an elastomeric material, as disclosed in U.S. Pat. Nos. 6,082,025 and 6,127,026 to Bonk et al., both hereby incorporated by reference. In addition, numerous thermoplastic urethanes may be utilized, such as PELLETHANE, a product of the Dow Chemical Company; ELASTOLLAN, a product of the BASF Corporation; and ESTANE, a product of the B.F. Goodrich Company, all of which are either ester or ether based. Still other thermoplastic urethanes based on polyesters, polyethers; polycaprolactone, and polycarbonate macrogels may be employed, and various nitrogen blocking materials may also be utilized. Additional suitable materials are disclosed in U.S. Pat. Nos. 4,183,156 and 4,219,945 to Rudy, hereby incorporated by reference. Further suitable materials include thermoplastic films containing a crystalline material, as disclosed in U.S. Pat. Nos. 4,936,029 and 5,042,176 to Rudy, hereby incorporated by reference, and polyurethane including a polyester polyol, as disclosed in U.S. Pat. Nos. 6,013,340; 6,203,868; and 6,321,465 to Bonk et al., also hereby incorporated by reference.

The fluid within bladder 40 may be any of the gasses disclosed in U.S. Pat. No. 4,340,626 to Rudy, hereby incorporated by reference, such as hexafluoroethane and sulfur hexafluoride, for example. The fluid may also include gasses such as pressurized octafluorapropane, nitrogen, or air. In addition to gasses, various gels or liquids may be sealed within bladder 40. Accordingly, a variety of fluids are suitable for bladder 40. With regard to pressure, a suitable fluid pressure is 20 pounds per square inch, but may range from one to thirty-five pounds per square inch. Accordingly, the fluid pressure within bladder 40 may be relatively high, or the fluid pressure may be slightly elevated from ambient in some embodiments of the invention.

Figure 7:
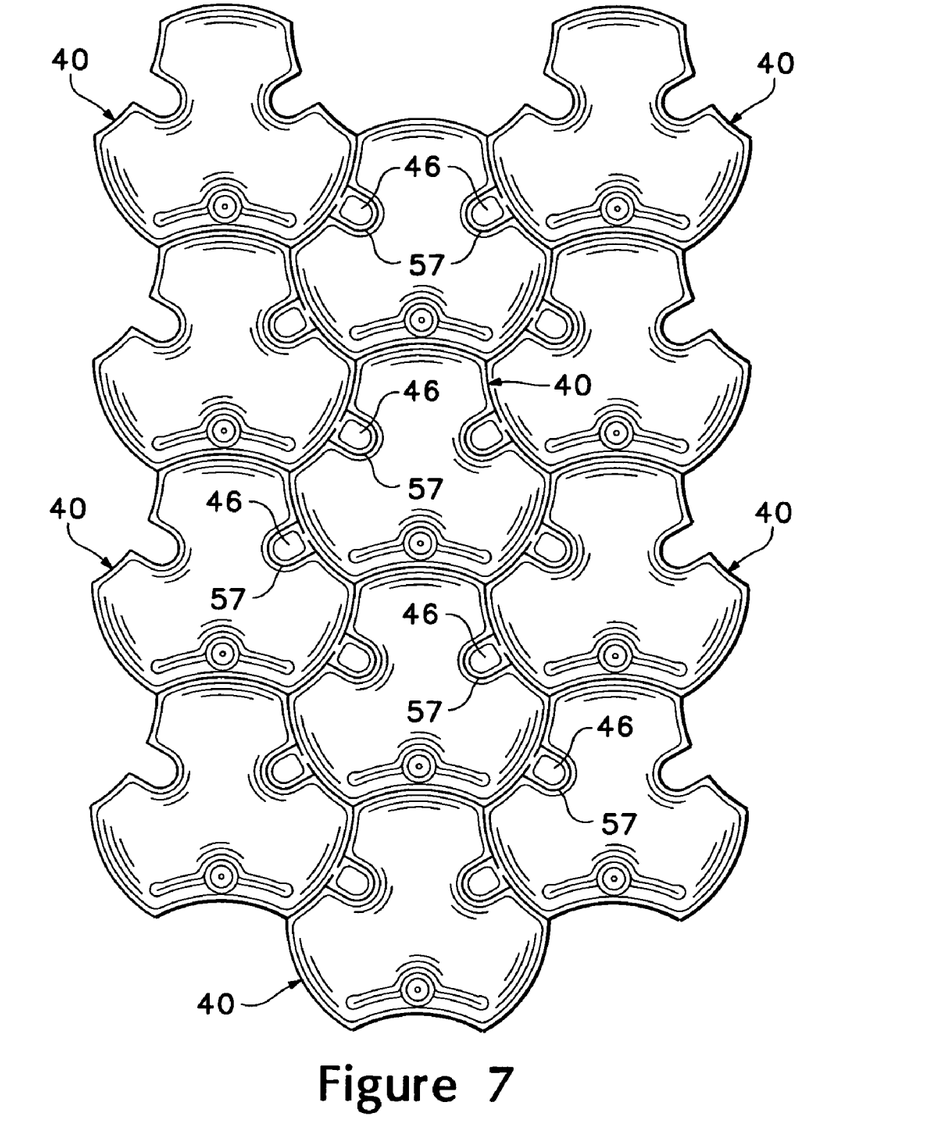
FIG. 7 is a top plan view of a plurality of the bladder in a joined configuration.

Bladder 40 may have the configuration of a tessellation. As utilized herein, the term "tessellation" is defined as a covering of an area, without significant gaps or overlaps, by a plurality of elements having a substantially similar shape. In addition, an individual element (i.e., bladder 40) may have the configuration of a tessellation when multiple, similarly-shaped elements cover an area without significant gaps or overlaps. Bladder 40, when viewed in either of FIGS. 4 and 5, has the general configuration of a tessellation. With reference to FIG. 7, a plurality of bladders 40 are depicted in a joined configuration. In general, the convex edges (i.e., edges 51, 53, and 55) of one bladder 40 extends into the concave edges (i.e., edges 52, 54, and 56) of an adjacent bladder 40, and this is repeated for the plurality of bladders 40. In addition, a tab 46 of one bladder 40 extends into the indentation 57 of an adjacent bladder 40. As depicted in FIG. 7, therefore, bladder 40 has the configuration of a tessellation.

Various shapes, whether hexagonal, rectangular, square, or triangular have the configuration of a tessellation. Other non-regular shapes may also have the configuration of a tessellation. Although bladder 40 is discussed above as having a generally hexagonal configuration, bladder 40 may also have a variety of other shapes that also have the configuration of a tessellation. In some aspects of the invention, however, bladder 40 may have shapes that are not a tessellation.

An advantage to forming bladder 40 in the configuration of a tessellation relates to manufacturing efficiency. With reference to FIG. 7, the plurality of bladders 40 are depicted in a joined configuration wherein each of bladders 40 is adjacent to other bladders 40. In this configuration, waste in the materials forming bladders 40 is minimized. In some prior art bladders, two sheets of polymer material were bonded together and inflated to form an individual bladder. The individual bladder was then cut from the two sheets of polymer material, which encircled the individual bladder. The remaining portions of the two sheets of polymer material were then discarded. Alternately, the remaining portions of the two sheets of polymer material were recycled (e.g., through a regrind process) to be incorporated into other bladders. In contrast with this prior art bladders, multiple bladders 40 are formed with greater manufacturing efficiency due to the limited amount of waste product.

Another advantage to forming bladder 40 in the configuration of a tessellation relates to energy efficiency. As noted above, the convex edges (i.e., edges 51, 53, and 55) of one bladder 40 extends into the concave edges (i.e., edges 52, 54, and 56) of an adjacent bladder 40, and this is repeated for the plurality of bladders 40. Each of the convex edges are formed, therefore with a convex edge in a single bonding operation. That is, the edges of two adjacent bladders are formed simultaneously to reduce the overall number of bonding operations that must occur to form multiple bladders 40, thereby promoting energy efficiency.

In the joined configuration of FIG. 7, a convex edge of a first bladder 40 extends into a concave edge of an adjacent second bladder 40. Similarly, a convex edge of the second bladder 40 extends into a concave edge of an adjacent third bladder 40. Furthermore, a convex edge of the third bladder 40 extends into a concave edge of the first bladder 40. In this manner, adjacent bladders 40 are effectively interlocked. Additionally, each bladder 40, with this exception of those located on the periphery of the joined configuration, are surrounded by six adjacent bladders 40 with convex edges extending into concave edges. Although the various bladders 40 are joined, the bladders 40 may be separated by bisecting the bonds between adjacent bladders 40. As described below, the bonds may be bisected so as to leave relatively small portions of the bonds between bladders 40 connected. In this manner, the plurality of bladders 40 remain joined, but may be pulled apart with minimal effort.

Figure 8:
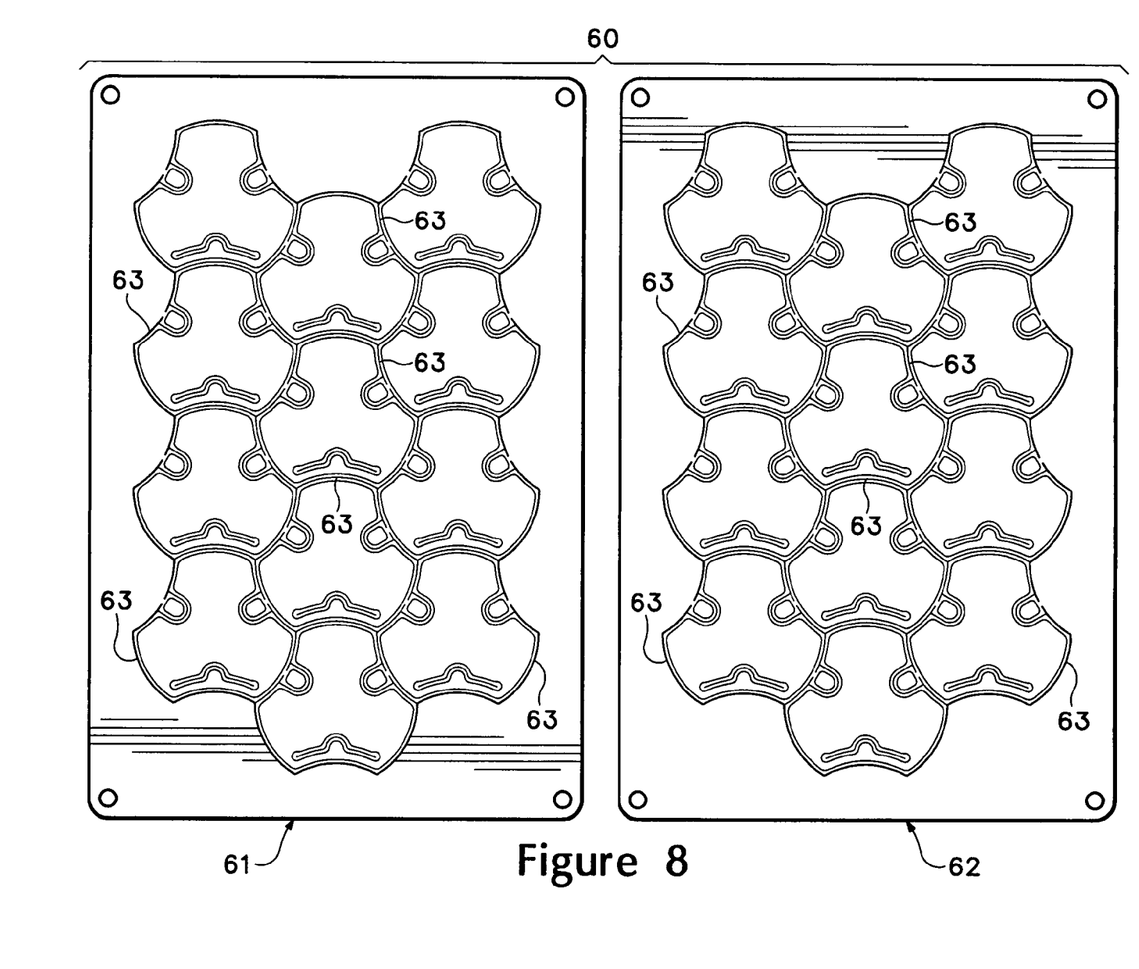
FIG. 8 is a top plan view of corresponding mold portions that form the bladder and a plurality of other bladders.

A method of manufacturing the plurality of bladders 40 depicted in FIG. 7 will now be discussed. FIG. 8 depicts a mold 60 having a pair of corresponding mold portions 61 and 62. Each of mold portions 61 and 62 have various ridges 63 that have the general shape of bladder 40. More particularly, ridges 63 have the shape of the various bonds of bladder 40, including peripheral bond 43 and inflation bond 44. When mold portions 61 and 62 are placed in an overlapping configuration, ridges 63 from mold portion 61 contact ridges 63 from mold portion 62. In some aspects of the invention, only one of mold portions 61 and 62 may include ridges 63 so that the other of mold portions 61 and 62 effectively has a planar configuration. Accordingly, the specific structure of mold portions 61 and 62 may vary significantly.

Figure 9A:
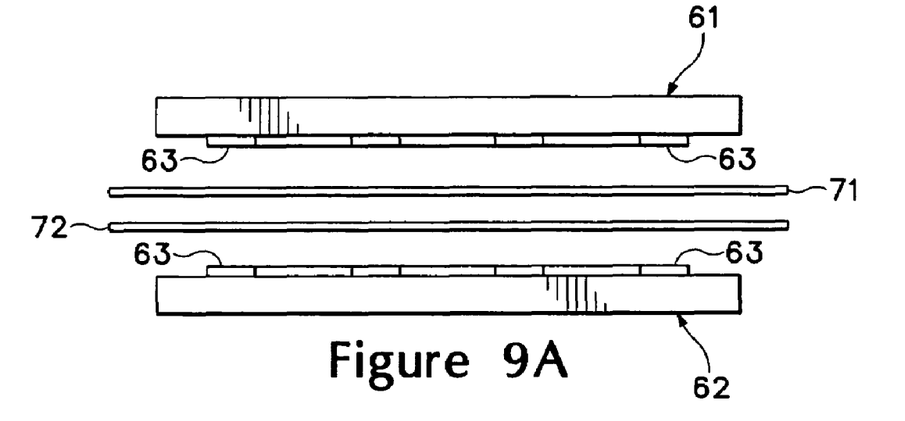
FIG. 9A is a schematic side elevational view of a first step in a manufacturing process of the blader and the plurality of other bladders.

With reference to FIG. 9A, one general step in the manufacturing process is depicted, in which two thermoplastic polymer sheets 71 and 72 are placed between mold portions 61 and 62. As will be apparent from the following discussion, sheets 71 and 72 respectively become first surface 41 and second surface 42 for each of the bladders 40 formed with mold 60. Accordingly, sheets 71 and 72 may be any of the various materials discussed above for bladder 40.

Figure 9B:
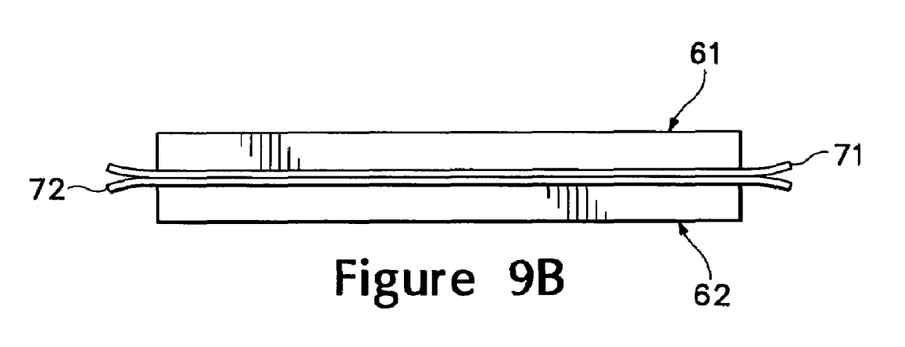
FIG. 9B is a schematic side elevational view of a second step in a manufacturing process of the bladder and the plurality of other bladders.

With reference to FIG. 9B, another general step in the manufacturing process is depicted, in which mold portions 61 and 62 compress and bond sheets 71 and 72. More particularly, mold portions 61 and 62 translate toward sheets 71 and 72 such that ridges 63 compress portions of sheets 71 and 72. Portions of mold 60, particularly ridges 63, then emit radio frequency energy such that the areas of contact between sheets 71 and 72 are irradiated with a specific level of the radio frequency energy for a predetermined period of time. The radio frequency energy is absorbed by sheets 71 and 72 and the temperature of sheets 71 and 72 rises until portions of sheets 71 and 72 melt, attain a glass transition temperature, or otherwise gain a temperature at which bonding may occur. Pressure applied to sheets 71 and 72 coupled with subsequent cooling forms a bond at the interface between sheets 71 and 72. Radio frequency bonding is one technique that may be utilized to bond sheets 71 and 72, thereby forming peripheral bond 43 and inflation bond 44. Other suitable bonding techniques include adhesive, thermal contact, laser, and infrared welding.

Figure 9C:
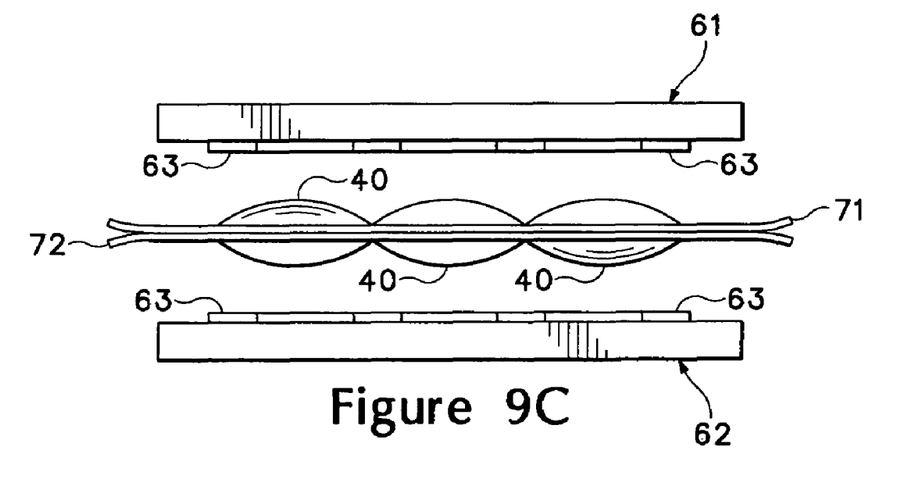
FIG. 9C is a schematic side elevational view of a third step in a manufacturing process of the bladder and the plurality of other bladders.

With reference to FIG. 9C, yet another general step in the manufacturing process is depicted, in which the bonded sheets 71 and 72 are removed from mold 60. As discussed above, the various bladders 40 are formed adjacent to each other. Accordingly, each bond between sheets 71 and 72 that is intended to form peripheral bonds 43 actually forms the peripheral bonds 43 for two adjacent bladders 40. A die or other cutting instrument is utilized, therefore, to bisect the various bonds between sheets 71 and 72, thereby separating bladders 40 from each other. In order to ensure that bladders 40 remain connected, as in FIG. 7, only a majority of the various bonds between sheets 71 and 72 may be bisected. In addition, the bonds between sheets 71 and 72 that form inflation bond 44 is also bisected to separate inflation area 45 from the central portion of bladder 40. In some embodiments, mold 60 may be configured to bisect the bonds between sheets 71 and 72 following the irradiation with radio frequency energy.

Following bisection of the bonds between sheets 71 and 72, the various bladders 40 are inflated. In order to inflate bladders 40, an inflation needle, inflation nozzle, inflation electrode, or other inflation device may be coupled to inflation area 45 to inject the pressurized fluid. The fluid then passes through the conduit formed between peripheral bond 43 and inflation bond 44. Once bladder 40 is properly inflated with the fluid, inflation area 45 is sealed to seal the fluid within bladder 40. A further application of radio frequency energy or heat, for example, may be utilized to seal inflation area 45. As noted above, inflation bond 44 is bisected to separate inflation area 45 from the central portion of bladder 40. During inflation, first surface 41 and second surface 42 will expand outward. Bisecting inflation bond 44 decouples inflation area 45 from the central portion of bladder 40 and permits inflation area 45 to remain at a constant position as first surface 41 and second surface 42 expand outward.

As an alternative to the method discussed above, bladders 40 may also be formed through a blow molding process or a thermoforming process. In the thermoforming process, for example, sheets 71 and 72 are heated prior to placement between mold portions 61 and 62. When mold 60 compresses sheets 71 and 72 between ridges 63, bonding occurs at the specified locations. In order to draw sheets 71 and 72 into the contours of mold 60, a fluid may be injected between sheets 71 and 72. Air may also be removed from the area between sheets 71 and 72 and mold portions 61 and 62 through various vents in mold 60, thereby drawing sheets 71 and 72 onto the surfaces of mold portions 61 and 62. That is, at least a partial vacuum may be formed between sheets 71 and 72 and the surfaces of mold portions 61 and 62.

Figure 10:
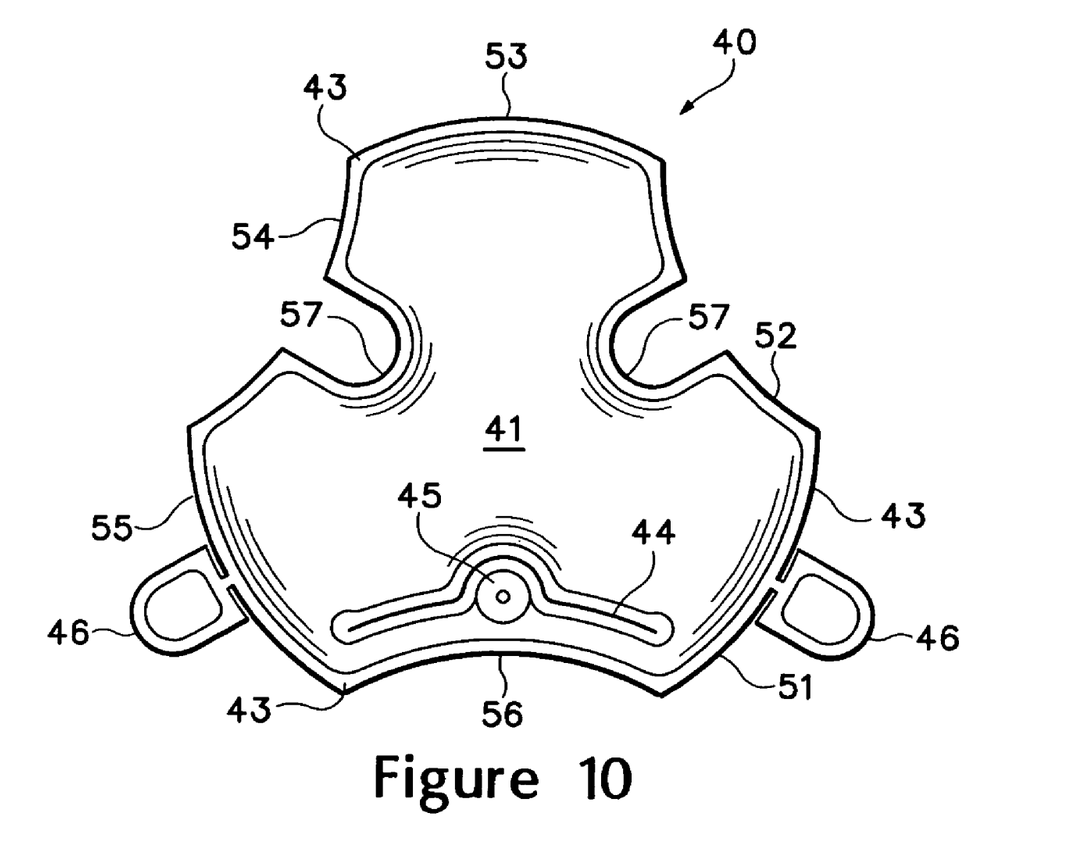
FIG. 10 is a top plan view of another configuration of the bladder.

FIG. 10 depicts an individual bladder 40 when removed from the plurality of bladders formed through the process discussed above. In contrast with the bladder 40 depicted in FIGS. 3-6C, the bladder 40 in FIG. 10 includes two tabs 46. One of the tabs 46 extends from edge 51, and the other of the tabs 46 extends from edge 55. As discussed above, tab 46 from one bladder 40 extends into the indentation 57 of an adjacent bladder 40. During manufacture, therefore, tabs 46 are part of the tessellation configuration of bladders 40. Once an individual bladder 40 is removed from the plurality of joined bladders 40 depicted in FIG. 7, tabs 46 may be removed. Alternately, tabs 46 may be utilized as locating points for positioning bladder 40 in a mold. That is, tabs 46 may assist in positioning bladder 40 in a mold that forms midsole 31, thereby assuring that bladder 40 is properly positioned and oriented in midsole 31.

Figure 11:
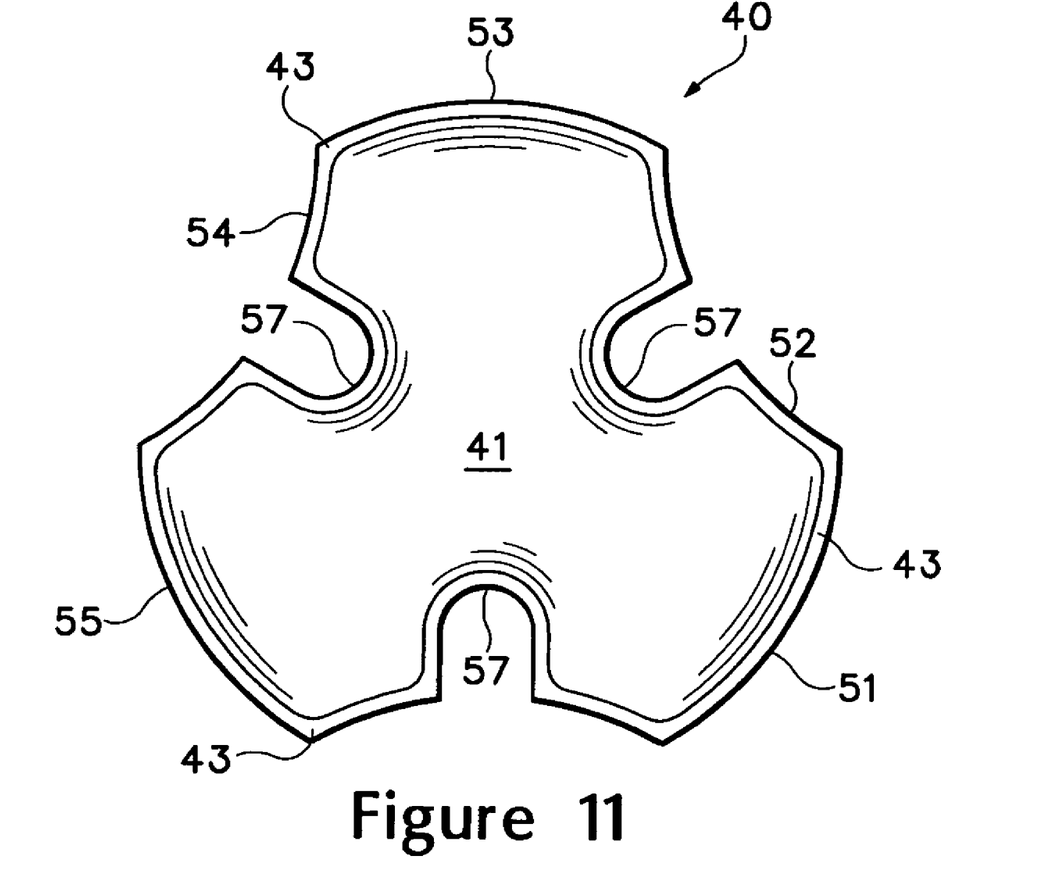
FIG. 11 is a top plan view of another configuration of the bladder.

The shape of bladder 40 may vary significantly within the scope of the present invention. Other modifications may also be made to bladder 40. For example, inflation bond 44 and inflation area 45 may be absent in some embodiments, as depicted in FIG. 11. In addition, bladder 40 may be incorporated into various products, in addition to footwear. For example, a plurality of bladders 40 may be utilized as packing materials. Bladders 40 may also be incorporated into seat cushions or a backpack or golfbag strap to enhance comfort. Accordingly, bladders 40 may be utilized in a variety of applications.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A plurality of joined bladders that enclose a pressurized fluid, the joined bladders comprising:
   a first bladder having a hexagonal configuration that includes three first convex edges alternating with three first concave edges;
   a second bladder having a hexagonal configuration that includes three second convex edges alternating with three second concave edges; and
   a third bladder having a hexagonal configuration that includes three third convex edges alternating with three third concave edges,
   wherein one of the first convex edges is positioned adjacent and joined to one of the second concave edges, one of the second convex edges is positioned adjacent and joined to one of the third concave edges, and one of the third convex edges is positioned adjacent and joined to one of the first concave edges.

2. The bladders recited in claim 1, wherein the first bladder, the second bladder, and the third bladder are substantially identical to each other.

3. The bladders recited in claim 1, wherein the first bladder has a first surface and an opposite second surface that are peripherally joined to define the first convex edges and the first concave edges.

4. The bladders recited in claim 3, wherein the first surface and the second surface are devoid of internal connections in a central portion of the first bladder.

5. The bladders recited in claim 1, wherein the first bladder includes a bond that is spaced inward from a periphery of the first bladder, the bond defining a channel between the bond and the periphery, and the channel extending substantially parallel to the periphery.

6. The bladders recited in claim 5, wherein the first bladder includes an inflation area in fluid communication with the channel, the inflation area providing a zone for inserting the fluid into the first bladder, and the inflation area being sealed to seal the fluid within the first bladder.

7. The bladders recited in claim 5, wherein the bond is bisected to separate the channel from a central portion of the bladder.

8. The bladders recited in claim 1, wherein the first bladder includes at least one tab extending from the one of the first convex edges.

9. The bladders recited in claim 8, wherein the tab extends into an indentation in the one of the second concave edges.

10. The bladders recited in claim 1, wherein the first bladder, the second bladder, and the third bladder form a tessellation pattern.

11. The bladders recited in claim 1, wherein the joined bladders further include four additional bladders, edges of the four additional bladders being positioned adjacent and joined to the first bladder.

12. An article comprising a plurality of bladders that enclose a pressurized fluid, each of the bladders having a tessellation configuration wherein edges of a first bladder are positioned adjacent to edges of a plurality of second bladders, the edges of the first bladder including a convex edge, and the edges of the plurality of the second bladders including a concave edge, the convex edge being positioned adjacent and joined to the concave edge, wherein the first bladder and the second bladders have a hexagonal configuration.

13. The article recited in claim 12, wherein a tab protrudes from the convex edge, and the tab extends into a corresponding indentation in the concave edge.

14. The article recited in claim 12, wherein the first bladder and the second bladders are substantially identical to each other.

15. The article recited in claim 12, wherein the first bladder includes a bond that is spaced inward from a periphery of the first bladder, the bond defining a channel between the bond and the periphery, and the channel extending substantially parallel to the periphery.

16. The article recited in claim 15, wherein the first bladder includes an inflation area in fluid communication with the channel, the inflation area providing a zone for inserting the fluid into the first bladder, and the inflation area being sealed to seal the fluid within the first bladder.

17. The article recited in claim 15, wherein the bond is bisected to separate the channel from a central portion of the bladder.

18. A bladder comprising:
   a first surface and an opposite second surface that are peripherally-joined to define an edge of the bladder, the first surface and the second surface enclosing a pressurized fluid within the bladder, wherein the first surface and the second surface have a hexagonal configuration, and the edge is one of six edges of the bladder;
   a bond spaced inward from the edge of the bladder to define a channel between the bond and the edge; and
   an inflation area in fluid communication with the channel, the inflation area providing a zone for inserting the fluid into the bladder, and the inflation area being sealed to seal the fluid within the bladder.

19. The bladder recited in claim 18, wherein each of the bond and the channel extend substantially parallel to the edge.

20. The bladder recited in claim 18, wherein the inflation area is centrally-located with respect to the channel.

21. The bladder recited in claim 18, wherein the bond is bisected to separate the channel from a remainder of the bladder.

22. The bladder recited in claim 18, wherein the channel extends from opposite sides of the inflation area.

23. The bladder recited in claim 18, wherein three of the six edges have a convex configuration, and another three of the six edges have a concave configuration.

24. The bladder recited in claim 18, wherein the edge has a concave configuration, and the bond and the channel extend substantially parallel to the edge.

* * * * *

UNITED STATES PATENT AND TRADEMARK OFFICE
CERTIFICATE OF CORRECTION

PATENT NO.         : 7,401,369 B2
APPLICATION NO.    : 11/107354
DATED              : July 22, 2008
INVENTOR(S)        : Vincent F. White et al.

It is certified that error appears in the above-identified patent and that said Letters Patent is hereby corrected as shown below:

On the Title Page, item 75, Inventors:
    Insert --Stuart C. Forstrom, Beaverton, OR (US)--

Signed and Sealed this

Twenty-fourth Day of November, 2009

David J. Kappos
*Director of the United States Patent and Trademark Office*